May 21, 1940.  C. PYLE, 3D  2,201,502
FRACTIONATING COLUMN
Filed March 17, 1939  3 Sheets-Sheet 3

Cyrus Pyle III INVENTOR

BY
ATTORNEY

Patented May 21, 1940

2,201,502

UNITED STATES PATENT OFFICE 2,201,502

FRACTIONATING COLUMN

Cyrus Pyle, III, Waynesboro, Va., assignor to E. I. du Pont de Nemours & Company, Wilmington, Del., a corporation of Delaware Application March 17, 1939, Serial No. 262,378

5 Claims. (Cl. 261—113)

The present invention relates to fractional distillation, and particularly relates to an improved construction of sieve-plate fractionating columns for separating the components of "imperfect" solutions. The term "imperfect" as applied to solutions will be used through the specification and claims to denote those solutions of miscible liquid components in which the product of the latent heat of evaporation $(r)$ and the square root of the vapor density $$(\sqrt{d})$$

of one component will differ by at least 20% from the same product of another component. Other solutions of miscible liquid components will hereinafter be termed "perfect" solutions.

Fractional distillation is ordinarily performed in equipment consisting essentially of a vaporizing kettle, a fractionating column, and a condenser. Although Coffey built a sieve-plate fractionating column as early as 1832, the advance in this art has been extremely slow and the design of fractionating columns even today is largely based on empirical considerations derived from long and varied practical experience. A customary sieve-plate fractionating column comprises a cylindrical column in which a sufficient number of perforated plates are provided to effect the desired degree of separation. The plates are positioned substantially level and substantially equidistant apart. In each plate there are a large number of very small and very closely spaced openings (0.08 inch to 0.25 inch in diameter) for the upward passage of the vapors. The small openings break up the vapors so that good surface contact is made with the liquid on the plates. Each plate is provided with a "downpipe," i. e. a short pipe extending upward through the plate and serving as a dam or weir to maintain the liquid level on the plate constant and to provide a passage for the downward flowing liquid.

In separating the liquid components of a solution in such a column, the vapors of the less volatile liquid component or components tend to condense and flow back as reflux liquor in seriatim from plate to plate through the downpipes. The vapors of the more volatile liquid tend to pass upward in seriatim from plate to plate through the numerous sieve-holes and support a layer of condensed liquid on each of the perforated plates. By virtue of differential condensation and vaporization which results from passing the rising vapors through liquid successively richer in the more volatile component, the vapors emerging from the top of the column are largely freed from the less volatile liquid components and they are then caused to condense. A portion of the condensate is removed as product and the remainder returned as reflux to the top plate of the column.

In the sieve-plate fractionating columns used heretofore, all the plates in the entire column, or in the entire section of a given diameter of a column have been provided with holes of about the same size and number, regardless of the type of solution being fractionated. If the solution consisted of a perfect solution, i. e., the $$r\sqrt{d}$$

of one component differed by less than 20% from the $$r\sqrt{d}$$

of another component, the separation could be accomplished quite efficiently. However, in the fractionation of components of an imperfect solution the separation could not be carried out efficiently from a standpoint of productive capacity, and stability of operation. With one given hole area in the plates the latter type of solution may, for instance, "load" on one or more plates in the column; i. e., due to insufficient hole area in the plate, the velocity of the vapors passing upward therethrough is increased beyond a critical point, and the increase in differential pressure across the plate causes some of the vapors to push up through the downpipe, thereby entrapping an undesirably large volume of condensed liquid on the plate. On the other hand, if a larger hole area is provided and loading is thus avoided, in some other section of the column, the velocity of the rising vapors may be so small as not to support a sufficient depth of liquor on the plate to effectively scrub the vapors passing therethrough.

In other words, it has now been observed that in the case of an imperfect solution there is a definite change in vapor velocity and/or vapor density from one portion of the fractionating column to another, whereas in the case of a perfect solution, i. e., a solution consisting of volatile liquid components having substantially the same $$r\sqrt{d}$$

no such changes take place.

It is, therefore, an object of this invention to provide an improved sieve-plate fractionating column for handling imperfect solutions wherein the rising vapors effectively support the desired depth of liquid retained on the sieve-plates throughout all portions of the column. Another object of the invention is to increase the efficiency, productive capacity, and stability of operation of a sieve-plate fractionating column in separating the volatile liquid components of an imperfect solution. Other objects will be apparent from the description that follows.

The objects of the invention may be accomplished by maintaining the pressure drop through the vapor holes in each plate substantially constant. In other words, the equation $V^2d=K$, wherein V is the linear velocity in feet per second through the free hole area in any one plate, $d$ the density of the vapors at that point, and K a constant, must be substantially maintained in each plate throughout the column to get the best results.

It should be understood, however, that a very substantial improvement over the prior art can be made by more nearly approaching a constant value for $V^2d$ without actually attaining it. If in fractionating imperfect solutions no attempt is made to keep $V^2d$ constant, the product of $V^2d$ at one plate in the column may be as much as 2 or 3 times that at some other plate in the column. For instance, in the case of acetic acid-water solution, assuming a constant hole area, the $V^2d$ for 100% acetic acid vapor would be about 2.4 times the $V^2d$ for 100% water vapor. Therefore, if this value be reduced to 1.5 times the $V^2d$ for 100% water vapor, there will be a vast improvement over the prior art. On the other hand, with a constant hole area the maximum $V^2d$ may be only about 1.5 times the minimum $V^2d$ with certain solutions which are considered as falling within the scope of this invention. For instance, in the case of methanol and water, $V^2d$ for pure methanol vapor will be very nearly 1.5 times the $V^2d$ for pure water vapor, the hole area being constant. Therefore, this invention is limited to reducing the spread between maximum and minimum $V^2d$ to less than 50%, and preferably to less than 25%, of that normally present in fractionating columns containing plates of constant hole area.

The details of the invention will be more clearly apparent from the description which follows when taken in conjunction with the accompanying illustrations in which.

An imperfect solution composed of 70% acetic acid and 30% water is to be fractionally distilled to produce glacial acetic acid and a 30% acetic acid—70% water mixture. In this case, the latent heat of vaporization in B. t. u.'s per pound is 174 for glacial acetic acid and 970 for water. The vapor densities are also widely different; i. e. 0.194 pound per cubic foot for acetic acid and 0.0375 for water. Applying the rule previously given for determining an imperfect solution, the latent heat times the square root of the density for acetic acid is 76.5 and for water 187.

Figure 1:
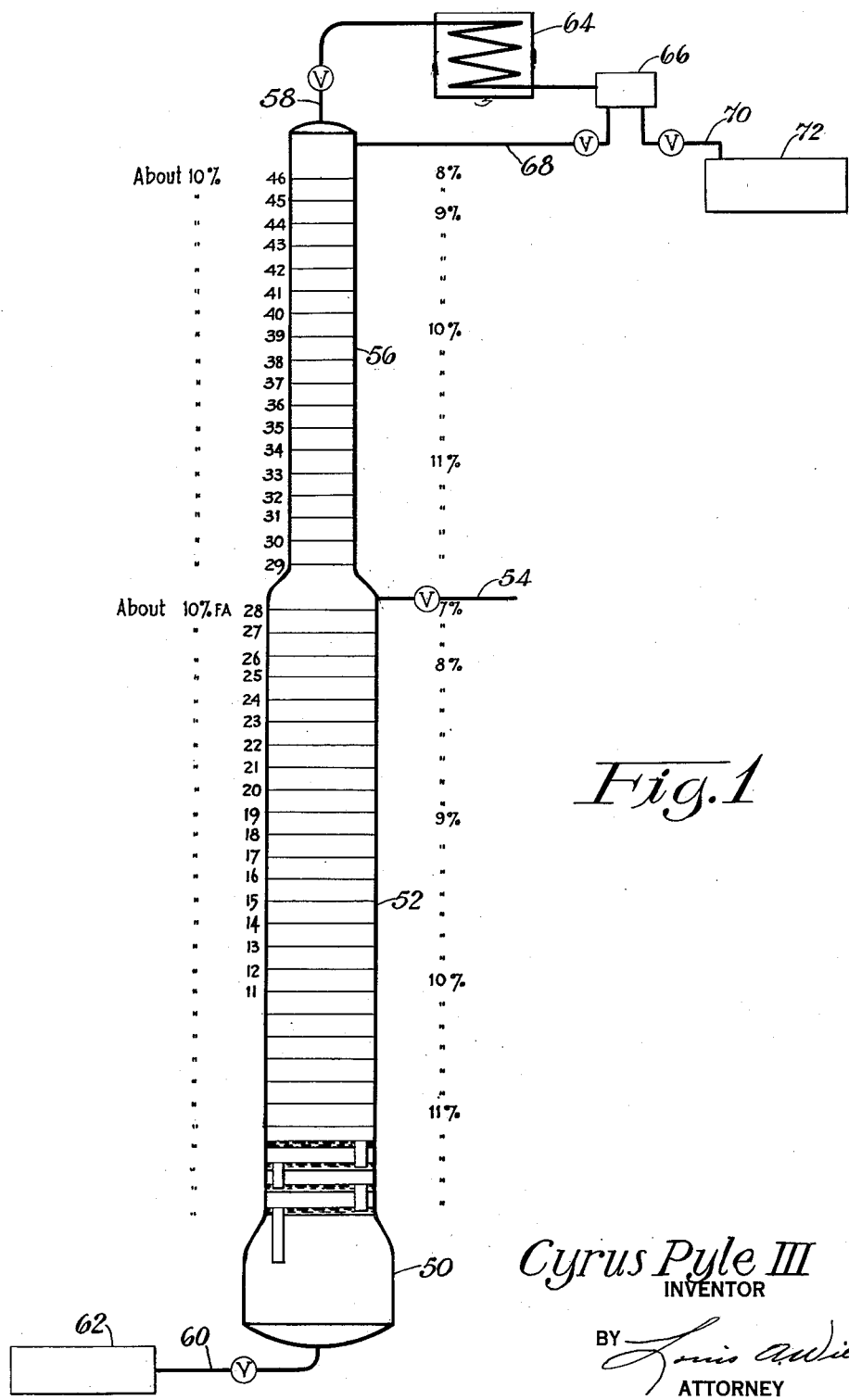
Figure 1 is a diagrammatic illustration of one form of fractionating column constructed in accordance with the invention.

A continuous sieve-plate fractionating column of the general type shown in Figure 1 for handling this 70% acetic acid—30% water solution, which is to be fed into the column in its liquid state and at its boiling temperature, is to be designed. The fractionating column shown in this figure comprises a vaporizing kettle 50, an exhausting section 52, a feed line 54, a rectifying section 56, a vapor conduit 58, residue conduit 60, a residue collector 62, a condenser 64, a condensate collector 66, a reflux conduit 68, a distillate conduit 70, a distillate collector 72 and plates numbered from 1 to 46.

The vaporizing kettle, which will contain substantially pure acetic acid, will be heated in any suitable way to provide the desired heat input of 5,490,000 B. t. u.'s per hour. This heat input is arbitrarily chosen to produce the desired yield of products. Any other heat input could likewise be chosen for purposes of the following illustrative procedure of design. To calculate the cubic feet of acetic acid vaporized per second, the heat input per hour is divided by 3600 to convert it to heat input per second, divided by the latent heat of vaporization (174 B. t. u.'s per pound) and by the vapor density 0.194 pound per cubic foot. The result is 45.2 cubic feet of vaporized acetic acid per second. Based upon known practice, with particular reference to support of liquid on the plate and entrainment of liquid, the vaporized acetic acid must have a velocity, immediately below the bottom plate, of 2.5 feet per second. The area of the plate must, therefore, be equal to 45.2 divided by 2.5, or 18.1 square feet, and the plate diameter will be 58 inches (approx.). It has been found that the hole area for the upward passage of vapor through the plates should in no case be less than 5%, nor more than 15% of the total plate area. Best results are realized when the hole area is between 7% and 13% of the total plate area. Since the hole area must be reduced in this case as the vapors pass up the column in order to keep $V^2d$ constant, the first plate will preferably be provided with a hole area in the upper section of the above-mentioned 7%–13% range. Therefore, an 11% hole area will be used in the first or bottom plate. The hole velocity through the first plate will then equal 2.5 divided by 0.11 or 22.7 feet per second.

Since the velocity will depend on the total plate hole area (A), which for convenience will be expressed as percentage of the entire plate area, and on the volume of vapor (Q) passing through that plate in a unit of time, for instance in cubic feet per second, the formula $V^2d=K$ can be expressed as $$\frac{Q^2}{A^2} \cdot d = K$$

or $$\sqrt{K} = \frac{Q\sqrt{d}}{A}$$

or $$C = \frac{Q\sqrt{d}}{A}$$

C being a new constant. Using this last equation, and substituting the above-mentioned values of the volume and density of the vapors passing through the bottom plate of 11% hole area, C is found to be 181.

The number of plates used in a fractionating column, of course, depends upon the relative volatility of the two or more components being separated and the degree of separation desired. The number of plates to be used in any particular instance may be determined by such known methods as the McCabe and Thiele's method, or Sorel's method.

In the fractionating column of the present example a total of 46 plates is used. In the case of liquid feed, it has been found advantageous to reduce the size of the column, i. e., the area of the plates above the point of feed. Of the 46 plates in the present column 28 are located below the feed point and 18 plates above the feed point. The lower larger diameter portion is commonly termed the exhausting section, and the upper smaller diameter portion the rectifying section. On the 28th plate there will be a liquid mixture of 70% acetic acid and 30% water at the boiling point. The density of the vapors given off by this mixture can be readily calculated and is found to be .0835, and the latent heat of evaporation is 413. The heat input per second is 1525 B. t. u. (assuming no heat is lost from the fractionating column; in practice the loss is extremely low). The heat input will evaporate 3.7 pounds of this 70% acetic acid mixture per second, or the volume Q=3.7 divided by 0.0835=44.4 cubic feet per second. Now, substituting in the formula $$C = \frac{Q\sqrt{d}}{A}$$

using the value previously obtained for C, i. e. 181, the hole area at this point is found to be 7.1% the plate area. In practice, the equation $V^2d=K$ will be sufficiently well satisfied if the plates are perforated to the nearest 1% of the plate area, and in this way a number of plates having the same hole area may be used, without, however, materially affecting the efficiency, productive capacity or stability of operation. In the instant design the equation $V^2d=K$ will be satisfied to within 1% of the plate area if the first 5 plates will be the same, with a hole area of 11% of the total plate area; the next 6 plates will be the same, with a hole area of 10% of the total plate area; plates 12 to 18 inclusive, will each have a hole area of 9% of the total plate area; plates 19 to 25, inclusive, will each have a hole area of 8% of the total plate area; and plates 26 to 28, inclusive, will each have a hole area of 7% of the total plate area.

Plate 29, the first of the plates in the rectifying section, will require substantially the same vapor velocity through it as plate 28. However, it is desired to have the hole area here equal to 11% of the total plate area so that as the hole area is reduced in going to plate 46, the hole area of plate 46 will not be reduced to a very low percentage of the total plate area. In other words, here again the total hole area of the plate should lie within the range 5%–15% of the total plate area. Therefore, the actual hole area in plate 29 should be substantially the same as the actual hole area in plate 28. To satisfy these requirements, 18.1 square feet, the area of plates 1 to 28, is multiplied by $$\frac{7.1}{11}$$

the resulting area being 11.7, and the diameter of the plates in the rectifying section will then be 47″ (approx.). Arising from the solution on top plate 46 there are 44.8 cubic feet per second of mixed vapors composed of substantially 30% acetic acid and 70% water, which have an average density of 0.0468. Again substituting in the formula $$A = \frac{Q\sqrt{d}}{C}$$

A will be found to be 5.34% of the area of the 58″ diameter plate, or in terms of the 47″ diameter plate it becomes 8.1%. In the rectifying section the equation $V^2d=K$ will be satisfied to within 1% of the plate area if the plates are now arranged as follows: Plates 29 to 33, inclusive, will each have a hole area of 11% of the total plate area; plates 34 to 39, inclusive, will each have a hole area of 10% the total plate area; plates 40 to 44, inclusive, will each have a hole area of 9% the total plate area; and plates 45 and 46 will each have a hole area of 8% the total plate area. Thus, the equation $V^2d=K$ is substantially satisfied throughout the entire length of both the exhausting and rectifying sections of the fractionating column.

As another specific illustration of this invention, an imperfect solution composed of 50% methanol and 50% water is to be fractionally distilled to recover pure methanol and pure water. In this illustration no definite hole velocity or definite hole area need be considered, but only a ratio of velocities or hole areas. The latent heat of vaporization of methanol in B. t. u.'s per pound is 473, and of water 970. In this case, 1800 B. t. u. per second input will evaporate 3.81 pounds of methanol and 1.86 pounds of water per second. The vapor density of pure methanol can be calculated and will be found to be 0.072 pound per cubic foot. The vapor density of water at its normal boiling temperature will be, as before, 0.0375. At the bottom of the column there is substantially pure water vapor passing up through the bottom plate at the rate of 49.6 cubic feet per second, the hole area of which will be chosen as 8% of the total plate area, for as the vapors rise up through the column it will be found necessary to increase the hole area to maintain $V^2d$ constant. Therefore, solving for C in the formula $$C = \frac{Q\sqrt{d}}{A}$$

it is found to be 120. At the top of the column, i. e. through the top plate, 53 cubic feet of substantially pure methanol are passed in the same unit of time, which has a vapor density of 0.072. Substituting in the equation again and solving for A, the hole area of the top plate, expressed as percentage of the total plate area, is found to be 11.8%.

Figure 2:
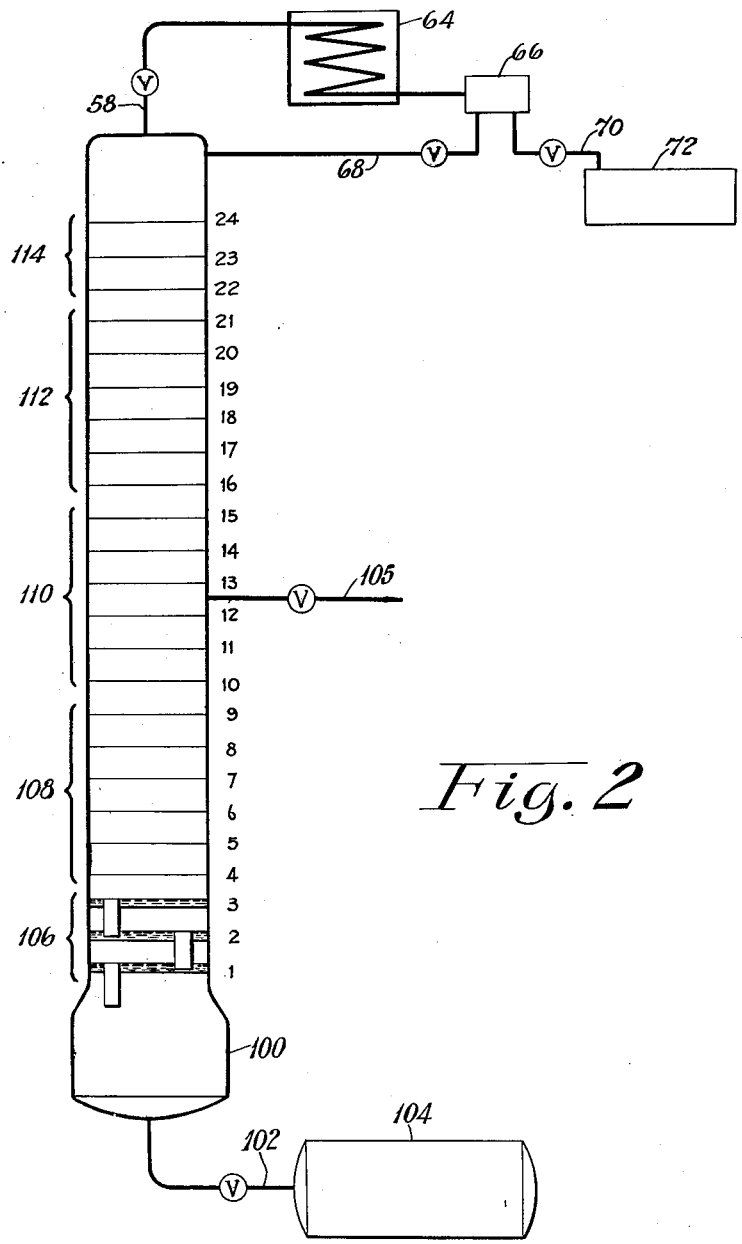
Figure 2 is a similar diagrammatic illustration of another modification of fractionating column.

From the above values a fractionating column as shown in Figure 2 can now be constructed in accordance with the invention. The fractionating column in Figure 2 comprises a vaporizing kettle 100, a residue conduit 102, a residue collector 104, five plate sections 106, 108, 110, 112 and 114 and plates numbered from 1 to 24. The feed line 105 will be located approximately midway between the top and bottom of the column. The condenser, distillate and reflux sections of this column are the same as those in Figure 1 and are designated by like reference numerals.

This column as shown contains 24 plates all of the same total plate area. Any other number of plates can, however, be used. The column is divided into five sections, the bottom section containing three plates each having a total hole area of 8%, the next section containing six plates each having a total hole area of 9%, the next section containing six plates each having a total hole area of 10%, the next section containing six plates each having a total hole area of 11% and the top section containing three plates each having a total hole area of 12%. In constructing a column with a greater or smaller number of plates the formula $V^2d=K$ can be substantially conformed to if the three center sections each contain about the same number of plates and the two end sections each contain about one-half the number of plates as the center sections. In a fractionating column constructed in this manner a substantially constant value for $V^2d$ will be attained throughout all portions of the column, and maximum efficiency, productive capacity and stability of operation will be realized.

Figure 3:
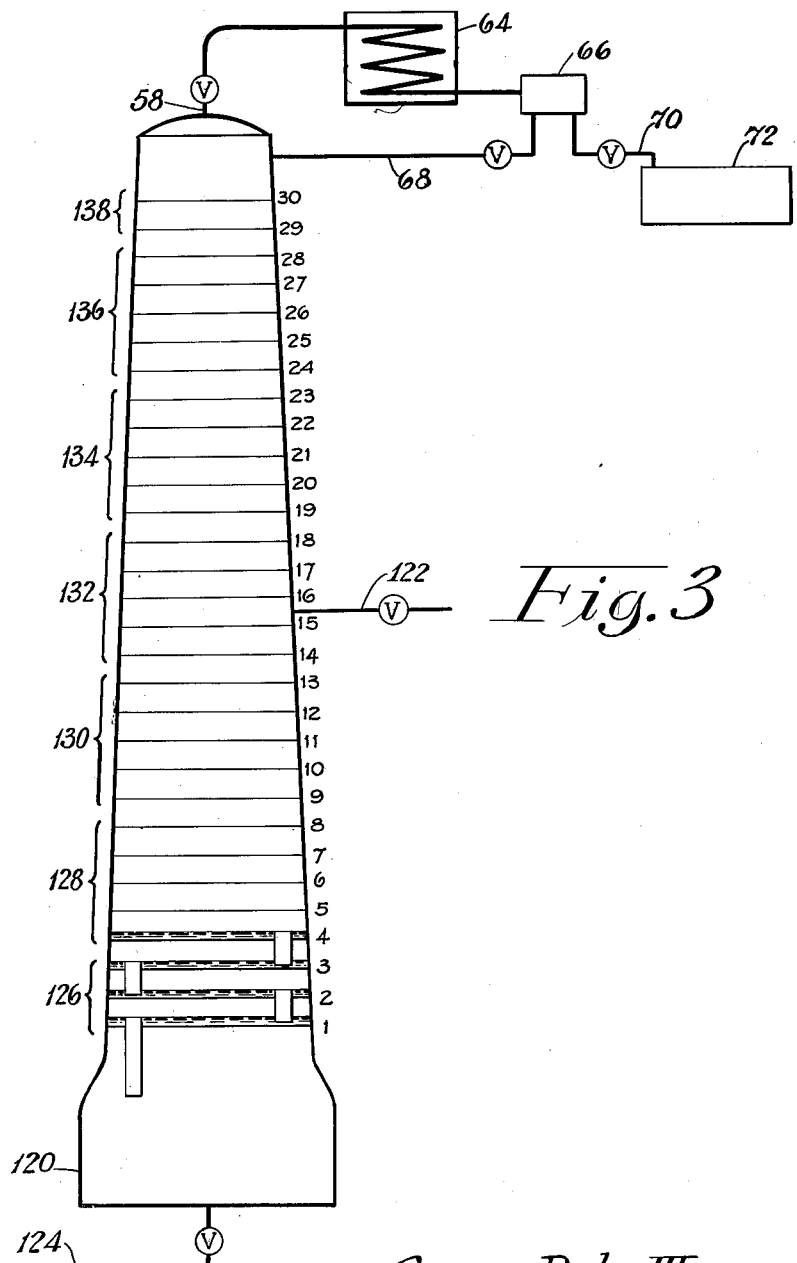
Figure 3 is a diagrammatic illustration of still another modified form of fractionating column.

Figure 3 illustrates a fractionating column for use in the fractionating of a mixture of methanol and ethyl ether. The solution is fed to the column as a 50–50 mixture of methanol and ethyl ether vapor. The feed line 122 will in this case also enter the column approximately midway between the top and bottom whereby to produce substantially pure ethyl ether and substantially pure methanol. The fractionating column in Figure 3 has the shape of a frustum of a cone and comprises a vaporizing means 120, a vapor feed line 122, a residue conduit 124, sections of plates 126, 128, 130, 132, 134, 136 and 138, and plates numbered from 1 to 30. The condenser, distillate and reflux sections of this column are the same as those in Figure 1 and are designated by like reference numerals.

It has previously been shown that the ratio of hole areas in the plates depends on the numerical value obtained by multiplying the volume of vapor passing through the holes in a unit of time by the square root of the vapor density. Assuming no heat losses throughout the length of the column, the hole areas will be proportional to these values of $$Q\sqrt{d}$$

if $V^2d$ is to remain constant. A comparison of $$Q\sqrt{d}$$

for pure ethyl ether and for methanol will first be made. 1800 B. t. u. per second will evaporate 28.9 pounds per second of ethyl ether which has a vapor density of .157. The volume of ethyl ether vapor created per second will equal 184 cubic feet, or $Q=184$.

$$\sqrt{.157} \text{ (for ethyl ether)} = .396$$

and $$Q\sqrt{d}=72.8$$

Similarly, for methanol the $$Q\sqrt{d}$$

will be equal to 14.2. Thus, the ratio of $$Q\sqrt{d}$$

for ethyl ether to the $$Q\sqrt{d}$$

for methanol is 5.1, or the hole area in the bottom plate of the column should be 5.1 times the hole area in the top plate of the column. It has repeatedly been stated above that the percentage of the plate occupied by the hole area should not be less than 5%, nor more than 15%, which is a ratio of only 3.0. The diameter of the column can, of course, be reduced at the point of feed, as in the case of the acetic acid-water column, but in the case of vapor feed this is not advisable. Therefore, this column will be constructed in the form of a frustum of a cone and at the same time the percent hole area of the plates will be decreased from the bottom to the top of the column. If the heat input is 900 B. t. u. per second, there will be 92 cubic feet of vapor to pass through the bottom plate per second, which may be made 6 feet in diameter (28.3 square feet) with 13%, or 3.68 square feet, hole area. The velocity through this plate will then equal 25 feet per second, or $V^2d=98$. The top plate will pass substantially pure methanol and with a heat input of 900 B. t. u. per second 26.5 cubic feet of vapor will be produced. Knowing $d$ to be .072, then $$V^2=\frac{98}{.072}=1360$$

or V will equal 37 feet per second. The hole area required is 26.5 divided by 37, or 0.72 square feet. If the area of the top plate be made the same area as the bottom plate, the hole area would be only about 2.5% of the plate area. If, however, the diameter of the top plate is 3.7 feet, the plate area will be 10.7 square feet and the hole area (0.72 square feet) 6.7%. In this case, each plate will be of different diameter with different hole area and also a different percentage of hole area. They will be arranged, of course, with diminishing hole area from the bottom to the top of the column. If 30 plates are to be used, each plate will differ from its adjacent plate by about 15 square inches in hole area. The formula $V^2d=K$ will be substantially complied with if in the bottom section of three plates each plate has a total hole area of 13%, in the next five sections of five plates each, each of the five plates in the respective sections has a hole area of 12%, 11%, 10%, 9% and 8%, and in the top section of two plates, each plate has a hole area of 7%.

If desired, the percentage hole area in each plate of the fractionating column of Figure 3 can be maintained constant, say at 10%, but the diameters of the plates and taper of the column would be much greater. For instance, a hole area of 3.68 square feet occupying 10% of the plate area would necessitate a plate of 36.8 square feet in area, or about 6.8 feet in diameter at the bottom and the top plate would be about 3.0 feet in diameter.

The invention comprehends particularly the efficient separation of lower aliphatic monocarboxylic acids, such as acetic and propionic, from aqueous solutions varying in concentration from 40 to 95 percent acid at a maximum rate in a sieve-plate fractionating column modified as stated heretofore. Broadly, the invention comprehends, however, the efficient separation of at least one component from an imperfect solution comprising volatile liquids that are mutually soluble in each other and that are capable of separation by fractional distillation. As typical of such solutions which may thus be separated may be mentioned, in addition to those already disclosed, acetone-water, ethanol-acetone, ethanol-benzene, diethyl ether-ethanol, diethyl ether-isopropanol, methanol-ethyl acetate, methanol-benzene, acetone-methanol, acetone chloroform, and benzene-carbon tetrachloride. Obviously, the proportion of one volatile component to the other component in such solutions is immaterial as long as the given solution is separable by fractional distillation. Likewise, such solutions may contain other relatively non-volatile substances.

In the application of the invention, the fractionation may be partial or complete. It is desirable that the solution supplied to the column be of substantially constant composition and be fed at a constant rate and that the supply of heat to to the kettle be maintained substantially constant. In all cases, of course, a sufficient number of plates is provided in the column to attain the desired degree of fractionation. If the desired degree of separation is slight, relatively few plates (5 to 10) are provided. If the desired fractionation is large, as in the case of separating off the water from 70% aqueous acetic acid to leave a glacial acetic acid concentrate, a relatively large number of plates, for instance 35 to 50, is provided.

The point feed of the solution to be fractionated is, of course, dependent upon the components to be separated. In some cases the solution may be fed as a liquid to the top of the column, and in other cases the solution may be fed as a vapor to the bottom of the column. Usually, however, the solution is fed to the column intermediate the top and bottom thereof.

The fractional distillations are conveniently performed at atmospheric pressure or slightly above atmospheric. However, if suitable adjustments are made to the change in conditions, the invention may be applied with advantage to fractional distillations under pressures ranging from a substantial sub-atmospheric pressure to a decided superatmospheric pressure.

In the case of imperfect solutions, the invention definitely enhances the productive capacity and stability of operation of the fractionating column and, in addition, minimizes the amount of steam or other heat required in the fractional distillation. The fractionating columns of the invention are relatively simple and inexpensive to construct, and, indeed, existing fractionating columns may be readily and inexpensively converted to conform with the principles of the invention.

Since it is obvious that many changes and modifications can be made in the above-described details without departing from the nature and spirit of the invention, the invention is not to be limited to said details except as set forth in the appended claims.

I claim:

1. A fractionating column for fractionating imperfect solutions which are capable of separation by fractional distillation, said column comprising a series of sieve-plates containing perforations varying in total area from plate to plate, the total area of the perforations in each of said sieve-plates varying from plate to plate substantially in accordance with the product of the square root of the vapor density times the volume of vapor passing in unit time through each of said sieve-plates as said vapor density and volume of vapor progressively vary from plate to plate in passing upwardly through said column.

2. A fractionating column for fractionating imperfect solutions which are capable of separation by fractional distillation, said column comprising a series of sieve-plates containing perforations varying in total area from plate to plate, the total area of the perforations in each of said sieve-plates being between 5% and 15% of the total area of said plate and varying from plate to plate substantially in accordance with the product of the square root of the vapor density times the volume of vapor passing in unit time through each of said sieve-plates as said vapor density and volume of vapor progressively vary from plate to plate in passing upwardly through said column.

3. A fractionating column for fractionating imperfect solutions which are capable of separation by fractional distillation, said column comprising a series of sieve-plates containing perforations varying in total area from plate to plate, the total area of the perforations in each of said sieve-plates varying from plate to plate approximately in accordance with the product of the square root of the vapor density times the volume of vapor passing in unit time through each of said sieve-plates as said vapor density and volume of vapor progressively vary from plate to plate in passing upwardly through said column so that the product of the density of the vapor times the square of the velocity of the vapors passing through any plate will not vary more than 50% from that of any other plate in said column.

4. A fractionating column for fractionating imperfect solutions which are capable of separation by fractional distillation, said column comprising a series of sieve-plates decreasing in area from the bottom to the top of said column, said sieve-plates containing perforations varying in total area from plate to plate, the total area of the perforations in each of said sieve-plates being between 5% and 15% of the total area of said plate and varying from plate to plate substantially in accordance with the product of the square root of the vapor density times the volume of vapor passing in unit time through each of said sieve-plates as said vapor density and volume of vapor progressively vary from plate to plate in passing upwardly through said column.

5. A fractionating column for fractionating imperfect solutions which are capable of separation by fractional distillation, said column comprising a number of sections containing sieve-plates, the sieve-plates in each section containing perforations varying in total area from the sieve-plates in other sections, the total area of the perforations in each of said sieve-plates of each section varying from those of other sections approximately in accordance with the product of the square root of the vapor density times the volume of vapor passing in unit time through the sieve-plates of said sections as said vapor density and volume of vapor progressively vary from section to section in passing upwardly through said column.

CYRUS PYLE, III.